United States Patent Office 3,641,169
Patented Feb. 8, 1972

3,641,169
STABILIZATION OF CHLORINATED SOLVENTS
Clarence R. Crabb, Elk Grove, Ill., and Leighton S. McDonald, Angleton, Tex., assignors to The Dow Chemical Company, Midland, Mich.
No Drawing. Continuation-in-part of application Ser. No. 608,748, Jan. 12, 1967. This application Oct. 30, 1968, Ser. No. 771,976
Int. Cl. C07c 17/42
U.S. Cl. 260—652.5 R                 13 Claims

ABSTRACT OF THE DISCLOSURE

Organic mercaptans and disulfides inhibit the metal-catalyzed reaction of an epoxide wth a carboxylic acid. Consequently, these sulfur compounds are useful as secondary inhibitors in epoxide-stabilized chlorinated solvents which may become contaminated with organic acids and metals, for example, degreasing and metal cleaning solvents.

CROSS-REFERENCE TO RELATED APPLICATION

This application is a continuation-in-part of our copending application Ser. No. 608,748 filed Jan. 12, 1967 and now abandoned.

BACKGROUND OF THE INVENTION

This invention relates to the stabilization of chlorinated hydrocarbon solvents. It relates particularly to a method whereby a stabilized solvent is protected against sudden loss of stabilizer and to the protected composition itself.

The problems resulting from decomposition of chlorinated hydrocarbon solvents upon exposure to elevated temperatures, atmospheric oxygen, and sunlight are well known. As a result of such decomposition, solvents such as carbon tetrachloride, chloroform, methylene chloride, methylchloroform, 1,2-dichloroethylene, trichloroethylene, perchloroethylene, ethylene dichloride, propylene dichloride and other polychlorinated aliphatic hydrocarbons of 1–3 carbon atoms become discolored and contaminated with corrosive products of decomposition, particularly hydrochloric acid, and are thereby severly impaired for use in such applications as metal degreasing, dry-cleaning, solvent extraction, paper dewaxing, and the like. Various additives have been employed to inhibit decomposition or to prevent corrosion by acidic products of that decomposition.

In recent years, neutral stabilizer systems for such solvents have been found to be particularly advantageous. These systems contain as a principal component an essentially neutral compound which acts as an acceptor of strong acids such as hydrochloric acid but does not ordinarily react with weak organic acids. This neutral compound is commonly an epoxide such as butylene oxide, propylene oxide, epichlorohydrin, butadiene dioxide, styrene oxide, glycidol, pentene oxide, cyclohexene oxide, or a mixture of two or more of these. However, solvents containing such epoxide stabilizers have been found to be subject to sudden depletion or even complete loss of the epoxide stabilizer under certain conditions which occur fairly commonly in applications such as noted above, particularly in metal degreasing processes.

Aliphatic hydrocarbon carboxylic acids, including acetic acid, butyric acid, adipic acid, and particularly higher fatty acids such as palmitic, stearic, oleic, and linoleic acids are found in numerous buffing compounds, cutting and flushing oils, grinding fluids, lubricants and other such compositions used in metal finishing. As a result, these acids are accumulated in metal degreasing solvents in substantial quantities and they remain in the solvents until the solvents are reclaimed. Such acids are also found to a somewhat lesser extent in solvents used in other cleaning or extracting processes. Ordinarily, these weak acids do not react with epoxides and so epoxide stabilizers then can remain as effective stabilizers in their presence.

It has been found recently, however, that metals or metal salts of carboxylic acids actively promote the reaction of an epoxide with a carboxylic acid or metal carboxylate to make the corresponding ester. The epoxide group is thereby used up and effectively removed from the scene. In a used chlorinated solvent where there is a substantial quantity of contaminating carboxylic acid, therefore, this reaction can, without warning, remove all or most of the epoxide stabilizer in a relatively short time, thereby leaving the solvent essentially unprotected. This catalytic effect is particularly strong where the metal involved is zinc and the effect is also present to a somewhat lesser degree in the case of iron and other common metals such as nickel, aluminum, or even calcium and sodium.

SUMMARY OF THE INVENTION

It has now been found that this metal-catalyzed reaction is effectively prevented and this kind of depletion of an epoxide stabilizer in a chlorinated hydrocarbon solvent is inhibited when there is dissolved in the epoxide-stabilized solvent a small but effective quantity of a secondary protective stabilizer which is an organic mercaptan or an organic disulfide. Any organic mercaptan or disulfide has this inhibiting effect and can be used for the purpose although some are obviously better suited to such use than others.

DETAILED DESCRIPTION

Mercaptans particularly effective for the purpose of the invention are represented by the formula

wherein R is an organic radical with a valence of $n$ and $n$ is an integer from one to about four, preferably one or two. R represents a hydrocarbon group which is aliphatic hydrocarbon of 1–20 carbon atoms, cycloaliphatic hydrocarbon of 5–10 carbon atoms, aromatic hydrocarbon of 6–20 carbon atoms, a hydrocarbon group of one of these classes having 1–4 substituents which are radicals of the group hydroxy, alkoxy of 1–4 carbon atoms, carboxy, carboxylic ester of 2–20 carbon atoms, nitro, amino, and chloro, or R may be a heterocyclic radical of 3–8 carbon atoms containing 1–2 heterocyclic atoms of the group oxygen, nitrogen, and sulfur such as furfuryl, a benzoxazole radical, a benzothiazole radical, a benzimidazole radical, or the like and such heterocyclic radicals having 1–2 substituents as listed above plus lower alkyl.

Disulfides which have been found to be similarly effective are those corresponding to the above mercaptans wherein $n$ is one and similar disulfides, all of which can be represented by the formula

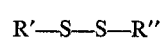

wherein R' and R" represent R or a group such as 4-morpholinyl, dialkoxyphosphinothionyl, piperazinylthiocarbonyl, dialkylthiacabamyl, or the like. Usually the disulfide is symmetrical, but mixed or unsymmetrical disulfides where the R's in the formula represent different groups are equally as effective.

Mercaptans illustrative of those defined by the above formula include aliphatic hydrocarbon mercaptans such as methyl mercaptan, allyl mercaptan, butyl mercaptan, octyl mercaptan, dodecyl mercaptan, eicosyl mercaptan, 1,2-ethanedithiol, and decamethylenedithiol; cycloaliphatic mercaptans such as cyclopentyl mercaptan, cyclohexyl mercaptan, and dipentene dimercaptan; aromatic hydrocarbon mercaptans such as thiophenol, thiocresol, naphthyl mercaptan, benzyl mercaptan, dodecylbenzyl mercaptan, butylbenzenethiol, and toluene-3,4-dithiol; substituted hydrocarbon mercaptans such as 2-mercaptoethanol, methyl mercaptopropionate, dodecyl mercaptopropionate, ethylenebis(mercaptoacetate), pentaerythritol tetra(mercaptoacetate), 2,3-dimercapto-1-propanol, 2-mercaptoethyl methyl ether, o-aminobenzoenethiol, and chlorobenzenethiol; and heterocyclic mercaptans such as furfuryl mercaptan, 2-thiazolethiol, 2,3-quinoxalinedithiol, and 2-mercaptobenzothiazole. Representative disulfides are those corresponding to the above monomercaptans and compounds such as allyl propyl disulfide, ethyl tolyl disulfide, dithiodipropionic acid and esters thereof, bis(o-nitrophenyl) disulfide, 2,2'-dithiodibenzoic acid, bis(chlorophenyl) disulfide, bis(dialkoxyphosphinothionyl) disulfide, bis(1-piperazinylthiocarbonyl) disulfide, bis(dimethylthiocarbamyl) disulfide, 4,4'-dithiodimorpholine, alkylphenol disulfide, and 2,2'-dithiobisbenzothiazole.

Particularly preferred for the purpose of minimizing odor problems are mercaptans and disulfides of the above formulas having boiling points above that of the solvent. Most preferred are organic disulfides as defined above which have a boiling point under normal atmospheric pressure above about 175° C. Thus, while mercaptans and lower boiling disulfides such as butyl marcaptan, octyl mercaptan, dimethyl disulfide, thiophenol, or benzyl mercaptan are effective and can be used for the purpose, it is preferred in some applications to use disulfides of low vapor pressure as specified above, for example, 4,4'-dithiodimorpholine, 2,2'-dithiobisbenzothiazole, dibutyl disulfide, dibenzyl disulfide, diphenyl disulfide, 2,2'-dithiodibenzoic acid, bis(p-chlorophenyl) disulfide, and the like.

For other purposes such as in vapor degreasing where a higher boiling additive may tend to become concentrated in the boiling sump and depleted in the vapors and condensate, a mercaptan or disulfide of the invention which has a boiling point close to that of the solvent is likely to be highly advantageous. Particularly preferred in such applications is dimethyl disulfide.

The quantity of mercaptan or disulfide ordinarily used is 0.001–1 percent based on the weight of solvent. More can be used but adds no significant advantage. Smaller quantities can be employed also, since any significant amount has some inhibiting effect. Mixtures of two or more such compounds can be used.

The practice of the present invention is illustrated by the following examples.

EXAMPLES 1-13

Trichloroethylene containing 0.3 weight percent of combined butylene oxide and epichlorohydrin as epoxide stabilizers was used as the test solvent. Samples were tested by combining in a 125 ml. flask 65 ml. of the stabilized trichloroethylene, 5 ml. of oleic acid, and sufficient mossy zinc to cover the bottom. The flask was put on a hot plate and connected to a reflux condenser, then the solvent was refluxed for 48 hours. At the end of the reflux period, the epoxide content of the solvent was determined analytically. Percentages listed in the following table are based on the weight of trichloroethylene.

TABLE I

| Example No. | Weight percent | Additive Name | Percent loss of epoxide |
|---|---|---|---|
| 1 | | None | 100 |
| 2 | 0.025 | Cyclohexyl mercaptan | None |
|   | 0.01 | do | 16.7 |
| 3 | 0.025 | Furfuryl mercaptan | None |
|   | 0.01 | do | 21.7 |
| 4 | 0.025 | Octyl mercaptan | 23.4 |
|   | 0.01 | do | 39.0 |
| 5 | 0.025 | 1,10-decanedithiol | 7.2 |
|   | 0.01 | do | 28.2 |
| 6 | 0.025 | Methyl 3-mercaptopropionate | 29.0 |
|   | 0.01 | do | 47.2 |
| 7 | 0.45 | 2-mercaptoethanol | None |
|   | 0.025 | do | 5.6 |
|   | 0.01 | do | 11.1 |
| 8 | 0.025 | 2,3-dimercapto-1-propanol | None |
| 9 | 0.4 | Dimethyl disulfide | None |
| 10 | 0.4 | Di-tert-butyl disulfide | None |
| 11 | 0.025 | Dibenzyl disulfide | 10.6 |
|    | 0.01 | do | 30.0 |
| 12 | 0.02 | 4,4'-dithiodimorpholine | None |
|    | 0.025 | do | None |
| 13 | 0.02 | 2,2'dithiobis benzothiazole | None |
|    | 0.005 | do | 30 |
|    | 0.0025 | do | 80 |

Tests similar to those described in the above table were run wherein the mercaptan or disulfide additive was nonyl mercaptan, 2-mercaptoethyl methyl ether, bis(dialkoxyphosphinothionyl) disulfide, and bis(1-piperazinylthiocarbonyl) disulfide respectively. Loss of epoxide from the stabilized trichloroethylene was inhibited or prevented in each case.

EXAMPLES 14–27

According to the procedure described in the above examples, samples of 1,2-dichloroethylene (a mixture of 60% cis isomer and 40% trans isomer) containing 0.3 percent by weight of butylene oxide said 0.1 wt. percent mercaptan or disulfide additive as noted was refluxed in the presence of oleic acid and zinc for 78 hours and the butylene oxide content was determined. Results are listed in Table II.

TABLE II

| Example No. | Additive | Percent loss of epoxide |
|---|---|---|
| 14 | None | 100 |
| 15 | Dibenzyl disulfide | 0 |
| 16 | 4,4'-dithiodimorpholine | 33 |
| 17 | 1-octanethiol | 67 |
| 18 | Decamethylenedithiol | 0 |
| 19 | 2,3-dimercapto-1-propanol | 67 |
| 20 | Dithiodipropionic acid | 33 |
| 21 | Ethylene bis(mercaptoacetate) | 17 |
| 22 | Alkylphenol disulfide | 17 |
| 23 | C₁₂-C₁₈ alkyl mercaptan | 33 |
| 24 | Dodecylbenzyl mercaptan | 33 |
| 25 | Dipentene dimercaptan | 33 |
| 26 | Pentaerythritol tetra(mercaptoacetate) | 33 |
| 27 | Tert-dodecyl mercaptan | 67 |

EXAMPLES 28–36

The procedure of the foregoing experiments was repeated using as the solvent a commercial methyl chloroform formulation containing a mixed inhibitor composition including 0.5 percent by weight of butylene oxide. The concentration of butylene oxide was determined after 78 hours of refluxing in the presence of 0.1 weight percent of a mercaptan or disulfide additive as noted.

TABLE III

| Example No. | Additive | Percent loss of epoxide |
|---|---|---|
| 28 | None | 70 |
| 29 | 1-octanethiol | 40 |
| 30 | Distearyl dithiodipropionate | 40 |
| 31 | Dibenzyl disulfide | 40 |
| 32 | Dodecylbenzyl mercaptan | 20 |
| 33 | Dipentene dimercaptan | 20 |
| 34 | 4,4'-dithiodimorpholine | 20 |
| 35 | Ethylene bis(mercaptoacetate) | 20 |
| 36 | Decamethylene dithiol | 40 |

EXAMPLES 37-44

Methylene chloride and chloroform, each containing 0.5 wt. percent butylene oxide, were refluxed as above in the presence of oleic acid and zinc with 0.1 et. percent of various mercaptan and disulfide additives. Epoxide content was determined after 16 hours. Examples No. 37-40 were run with methylene chloride, the rest with chloroform.

TABLE IV

| Example No. | Additive | Percent loss of epoxide |
|---|---|---|
| 37 | None | 100 |
| 38 | Dithiodipropionic acid | 0 |
| 39 | Dodecylbenzyl mercaptan | 60 |
| 40 | Dodecyl 3-mercaptopropionate | 0 |
| 41 | None | 100 |
| 42 | tert-Dodecyl mercaptan | 50 |
| 43 | Pentaerythritol tetra(mercaptoacetate) | 0 |
| 44 | 4,4'-dithiodimorpholine | 24 |

EXAMPLES 46-47

Perchloroethylene containing a tertiary amine stabilizer and 0.5 wt. percent butylene oxide was refluxed in the the presence of metallic zinc and oleic acid as described in Examples 1-13 for 8 hours and epoxide content was determined.

| Example No. | Additive Wt. percent | Name | | Percent loss of epoxide |
|---|---|---|---|---|
| 45 | None | | 0 | 100 |
| 46 | 0.1 | 4,4'-dithiodimorpholine | 0.2 | 60 |
| 47 | 0.1 | Ethylenebis-(mercaptoacetate) | 0.4 | 20 |

EXAMPLES 48

A stabilization test was run on a commercial scale using an open top, single compartment vapor degreasing apparatus with an operating capacity of about 150 gallons of solvent and having an offset condenser and clean solvent reservoir. The cleaning solvent was a commercial methyl chloroform formulation containing 0.5 weight percent 1,2-butylene oxide. The work load consisted of small zinc diecast parts coated with a commercial buffing compound which contained higher fatty acids of the oleic acid-stearic acid type.

The degreaser was first thoroughly cleaned and charged with fresh solvent before starting the test run. Samples were taken at regular intervals from the boiling sump and the distillate receiver and analyzed for epoxide content. The results were as listed below.

| Day No. | Volume percent butylene oxide | |
|---|---|---|
| | Distillate receiver | Boiling sump |
| 1 (start) | 0.5 | 0.5 |
| 4 | 0.186 | |
| 10 | 0.09 | |
| 18 | | 0.037 |
| 20 | 0.026 | |
| 25 | 0 | 0 |
| 30* | 0 | 0 |
| 33 | 0 | 0 |

*0.5 volume percent butylene oxide added after sampling.

It is apparent that after development of epoxide-destroying conditions in the degreasing solvent and the disappearance of the original epoxide stabilizer, addition of epoxide on Day No. 30 in the quantity originally present provided no lasting protection, for the added epoxide was gone within three days.

The above experiment was repeated with the single exception that 0.02 wt. percent of 4,4'-dithiodimorpholine was added to the starting epoxide-stabilized solvent. Analysis of samples taken as before revealed the following results:

| Day No. | Volume percent butylene oxide | |
|---|---|---|
| | Distillate receiver | Boiling sump |
| 1 (start) | 0.5 | 0.5 |
| 5 | 0.20 | 0.15 |
| 11 | 0.181 | 0.128 |
| 19 | 0.20 | 0.134 |
| 28 | 0.168 | 1.107 |

After an initial depletion, the epoxide content was relatively stable through the balance of the test.

EXAMPLE 49

An experiment was run in which the operating conditions of a vapor degreasing process were simulated. The apparatus consisted essentially of two one liter glass flasks mounted one above the other and forming a unit wherein the neck of the lower flask was fused to and projected through the bottom of the upper to form an overflow pipe within the upper flask. The neck of the upper flask was connected to a reflux condenser. Each flask was provided with a sample port from which liquid samples could be drawn. This apparatus was constructed to simulate a commercial vapor degreaser wherein the upper flask served as the condensate reservoir while the lower flask served as the boiling sump in which boilers would tend to accumulate. Partitioning of an inhibitor by concentration in one reservoir and depletion in the other could thus be observed by analysis of appropriate samples taken over a period of operation.

Three such apparatuses were set up for comparative runs. To each section of each double flask apparatus there was added 400 ml. of commercial trichloroethylene formulation containing 0.2 weight percent of 1,2-butylene oxide, and 0.089 weight percent of epichlorohydrin as acid acceptors, 50 ml. of oleic acid, and 15-20 g. of mossy zinc. In two of these runs, 0.064 weight percent of a sulfur compound as noted was added to each portion of solvent. The solvent in the bottom section of each apparatus was then heated to reflux temperature and refluxing was continued for several days. Samples were drawn from the upper (condensate) and lower (sump) sections of each apparatus in order to follow the degree of partitioning and loss of epoxide.

TEST NO. 1—NO SULFUR COMPOUND ADDED

| Day | Section | Percent total epoxide |
|---|---|---|
| 0 | Upper | 0.295 |
| | Lower | 0.295 |
| 1 | Upper | 0.295 |
| 2 | do | 0.150 |
| 3 | Upper | 0.010 |
| | Lower | Trace |
| 4 | Upper | 0 |

TEST NO. 2—0.064% DIMETHYL DISULFIDE ADDED

| Day | Section | Percent total epoxide |
|---|---|---|
| 0 | Upper | 0.295 |
| | Lower | 0.295 |
| 1 | Upper | 0.295 |
| 2 | do | 0.295 |
| 4 | do | 0.269 |
| 7 | Upper | 0.208 |
| | Lower | 0.095 |

The dimethyl disulfide was evenly distributed between the upper and lower sections after seven days.

TEST NO. 3—0.064% DIMETHYL SULFIDE

| Day | Section | Percent total epoxide |
|---|---|---|
| 0 | Upper | 0.295 |
|   | Lower | 0.295 |
| 1 | Upper | 0.295 |
| 2 | do | 0.260 |
| 4 | do | 0.142 |
| 7 | Upper | 0 |
|   | Lower | 0 |

All of the dimethyl sulfide had collected in the upper (condensate) section after seven days.

We claim:
1. A polychlorinated aliphatic hydrocarbon solvent of 1-3 carbon atoms containing a stabilizing quantity of at least one epoxide of the group butylene oxide, propylene oxide, epichlorohydrin, butadiene dioxide, styrene oxide, glycidol, pentene oxide, and cyclohexene oxide and, as a secondary protective stabilizer to inhibit the depletion of epoxide, an inhibiting quantity of at least one of an organic mercaptan and an organic disulfide, said mercaptan having the formula

R(SH)$_n$ wherein $n$ is an integer from one to four and R is an organic radical having a valence of $n$ which is
   (1) a hydrocarbon radical of the group:
      (a) aliphatic hydrocarbon of 1-20 carbon atoms,
      (b) cycloaliphatic hydrocarbon of 5-10 carbon atoms,
      (c) aromatic hydrocarbon of 6-20 carbon atoms
   (2) a hydrocarbon radical as in (1) having 1-4 substituents which are radicals of the group hydroxy, alkoxy of 1-4 carbon atoms, carboxy, carboxylic ester of 2-20 carbon atoms, nitro, amino, and chloro,
   (3) a heterocyclic radical of 3-8 carbon atoms containing 1-2 heterocyclic atoms of the group oxygen, nitrogen, and sulfur,
   (4) a heterocyclic radical as in (3) having 1-2 substituents of the group alkyl of 1-4 carbon atoms, alikoxy of 1-4 carbon atoms, hydroxy, carboxy, carboxylic ester of 2-20 carbon atoms, nitro, amino, and chloro, and said disulfide having the formula

R'—S—S—R'' wherein R' and R'' each represent R, 4-morpholinyl, dialkoxyphosphinothionyl, piperazinylthiocarbonyl, or dialkylthiocarbamyl.

2. The chlorinated solvent composition of claim 1 wherein the secondary stabilizer is an organic disulfide.
3. The composition of claim 2 wherein the disulfide is 4,4'-dithiodimorpholine.
4. The composition of claim 1 wherein the chlorinated solvent is dichloroethylene.
5. The composition of claim 1 wherein the chlorinated solvent is trichloroethylene.
6. The composition of claim 1 wherein the chlorinated solvent is perchloroethylene.
7. The composition of claim 1 wherein the chlorinated solvent is methyl chloroform.
8. The composition of claim 1 wherein the chlorinated solvent is methylene chloride.
9. The composition of claim 1 wherein the chlorinated solvent is chloroform.
10. The composition of claim 5 wherein the secondary stabilizer is 4,4'-dithiodimorpholine.
11. The composition of claim 5 wherein the secondary stabilizer is dimethyl disulfide.
12. The composition of claim 7 wherein the secondary stabilizer is 4,4'-dithiodimorpholine.
13. The composition of claim 1 wherein the quantity of secondary stabilizer is 0.001-1 percent based on the weight of solvent.

References Cited

UNITED STATES PATENTS

| 2,371,645 | 3/1945 | Aitchison et al. | 260—652.5 |
| 2,944,088 | 7/1960 | Kauder | 260—652.5 |
| 2,997,506 | 8/1961 | Wetroff et al. | 260—652.5 |
| 2,998,462 | 8/1961 | Crabb et al. | 260—652.5 |
| 2,999,886 | 9/1961 | Crabb et al. | 260—652.5 |
| 3,025,331 | 3/1962 | Dial | 260—652.5 |
| 3,150,166 | 9/1964 | Pohleman et al. | 260—652.5 X |
| 3,410,893 | 11/1968 | Levine | 260—652.5 X |
| 3,499,048 | 3/1970 | Cormany et al. | 260—652.5 |

FOREIGN PATENTS

| 863,718 | 3/1961 | Great Britain | 260—652.5 |
| 877,586 | 9/1961 | Great Britain | 260—652.5 |

HOWARD T. MARS, Primary Examiner

U.S. Cl. X.R.

252—170, 171, 406

UNITED STATES PATENT OFFICE
CERTIFICATE OF CORRECTION

PO-1050
(5/69)

Patent No. 3,641,169          Dated  8 February 1972

Inventor(s)  Clarence R. Crabb and Leighton S. McDonald

It is certified that error appears in the above-identified patent and that said Letters Patent are hereby corrected as shown below:

Column 4, line 19, in Table I, change the number in the Weight percent column following Example No. 12 from "0.025" to --0.0025--.

Column 6, line 9, change the last number under Boiling Sump column from "1.107" to --0.107--.

Signed and sealed this 1st day of August 1972.

(SEAL)
Attest:

EDWARD M. FLETCHER, JR.
Attesting Officer

ROBERT GOTTSCHALK
Commissioner of Patents